United States Patent
Matsuoka et al.

[11] Patent Number: 5,967,929
[45] Date of Patent: Oct. 19, 1999

[54] MULTIPLE DISK CLUTCH

[75] Inventors: Yoshihiro Matsuoka; Kouji Yoneyama, both of Neyagawa, Japan

[73] Assignee: Exedy Corporation, Osaka, Japan

[21] Appl. No.: 09/039,463

[22] Filed: Mar. 16, 1998

[30] Foreign Application Priority Data

Mar. 18, 1997 [JP] Japan .................................... 9-064998

[51] Int. Cl.$^6$ ............................ F16H 57/04; F16D 13/72
[52] U.S. Cl. .................. 475/159; 192/70.12; 192/87.11; 192/113.34
[58] Field of Search .......................... 192/70.12, 113.34, 192/85 AA, 18 A, 87.11; 475/159

[56] References Cited

U.S. PATENT DOCUMENTS

| | | | |
|---|---|---|---|
| 2,920,732 | 1/1960 | Richards et al. | 192/18 A X |
| 3,202,253 | 8/1965 | Merritt et al. | 192/85 AA X |
| 3,552,534 | 1/1971 | Kern | 192/113.34 |
| 4,085,835 | 4/1978 | Bailey | 192/113.34 |
| 4,446,953 | 5/1984 | Voss et al. | 192/70.12 |
| 4,458,793 | 7/1984 | Riese et al. | 192/70.12 X |
| 4,474,278 | 10/1984 | Miura . | |
| 4,597,479 | 7/1986 | Kitano et al. . | |
| 4,629,050 | 12/1986 | Valier | 192/113.34 |
| 4,664,240 | 5/1987 | Majima et al. . | |
| 4,924,978 | 5/1990 | Ohkubo . | |
| 4,942,779 | 7/1990 | Ohkubo . | |
| 5,400,884 | 3/1995 | Matsuoka | 192/113.34 X |
| 5,568,853 | 10/1996 | Adriaensens | 192/85 AA |
| 5,593,015 | 1/1997 | Kosumi et al. . | |
| 5,735,376 | 4/1998 | Moroto et al. | 192/113.34 X |
| 5,813,508 | 9/1998 | Shoji et al. | 192/113.34 |

Primary Examiner—Rodney H. Bonck
Attorney, Agent, or Firm—Shinjyu Global IP Counselors, LLP

[57] ABSTRACT

A multiple disk clutch used in an automatic transmission of an automobile or the like has a plurality of input friction plates and a plurality of output friction plates. These input and output friction plates are typically supplied with a lubricating oil to prevent overheating and abnormal abrasion. In the preferred embodiment, the transmission employs a pair of multiple disk clutches in which selected parts of multiple disk clutches are modified to direct oil radially outwardly via centrifugal force to lubricate the input and output friction plates. More specifically, the lubricating oil flows through ports which engage parts with guide portions for directing the oil through apertures located in a cylindrical member adjacent the input and output friction plates. In one embodiment, a spring retaining member is provided with a plurality of guide portions for guiding and directing the lubricating oil to the friction plates. In another embodiment, a thrust washer is utilized for directing the lubricating oil to the friction plates.

26 Claims, 9 Drawing Sheets

MULTIPLE DISK CLUTCH

BACKGROUND OF THE INVENTION

A. Field of the Invention

The present invention relates to multiple disk clutches for an automatic transmission of an automobile or the like. More specifically, the present invention relates to a multiple disk clutch having structure for supplying lubricating oil to friction pads or plates of a clutch.

B. Description of the Background Art

Generally, a multiple disk clutch used in an automatic transmission of an automobile or the like has a plurality of input friction plates and a plurality of output friction plates which are alternately arranged relative to each other. The multiple disk clutch also has a cylindrical input member arranged radially inside these friction plates and a cylindrical output member arranged radially outside the friction plates. Each input friction plate has at least one claw located at its inner periphery. The claws of the input friction plates movably engage grooves formed at the outer periphery of the cylindrical input member for movement in an axial direction. Each output friction plate has its at least one claw located at its outer periphery. The claws of the output friction plates movably engage grooves formed at the inner periphery of the cylindrical output member for relative axial movement.

In the multiple disk clutch, lubricating oil is typically supplied to the surfaces of the friction plates for preventing overheating and abnormal abrasion of the friction plates. The lubricating oil is generally supplied from an inner cylindrical member located near the axis of rotation. More specifically, the lubricating oil is supplied through an appropriate oil passage to an inner space inside of the inner cylindrical member, i.e., a cylindrical member located at a radially inner position, and then is supplied from the inner space by a centrifugal force to the surfaces of the friction plates through oil apertures formed in the inner cylindrical member.

In the prior art, the lubricating oil is typically supplied to many parts of the clutch. Thus, the prior art clutches do not efficiently supply the lubricating oil into the oil apertures of the inner cylindrical member from the radially inner space to the friction plates. Rather, in the prior art clutches, a large amount of oil unavoidably flows to other surface areas of the clutch than the surfaces of the friction plates.

SUMMARY OF THE INVENTION

One object of the invention is to provide a simple structure for efficiently directing lubricating oil from an inner cylindrical member, located at a radially inner position of a multiple disk clutch, to surfaces of friction plates.

In accordance with one aspect of the present invention, a multiple disk clutch is provided for supplying a lubricating oil from a radially inner position to the friction plates. The multiple disk clutch includes first and second members, first and second friction plates, a pressure plate, a return spring and a spring retaining member. The first member has a first cylindrical portion. The second member rotates relative to the first member, and has a second cylindrical portion arranged coaxially with and radially inside the first cylindrical portion. Preferably, the second member has a plurality of radial through apertures for allowing the lubricating oil to engage the friction plates. The first and second friction plates are non-rotatably and axially movably coupled to the first and second cylindrical portions, respectively. The first and second friction plates are alternately arranged in an axial direction between the first and second cylindrical portions. The pressure plate presses the first and second friction plates together by hydraulic pressure. The return spring is used to bias the pressure plate away from the first and second friction plates. The spring retaining member is arranged radially inside the second cylindrical portion, and has a spring seat portion supporting the return spring and a guide portion for guiding the lubricating oil to a position radially inside the second cylindrical portion.

The lubricating oil, which is supplied from a radially inner position of the multiple disk clutch, is guided to the inside surface of the second cylindrical portion by the guide portion of the spring retaining member. The lubricating oil is then supplied onto the first and second friction plates through radial apertures extending through the second cylindrical portion. The guide portion of the spring retaining member ensures that a large amount of lubricating oil can be supplied onto the first and second friction plates to reduce overheating and abnormal abrasion of the first and second friction plates. Since the spring retaining member, which is an existing part of the multiple clutch is used for guiding the lubricating oil, additional parts are unnecessary. Thus, the structure of the multiple clutch can be kept simple.

In accordance with a second aspect of the present invention, a multiple disk clutch is provided for supplying a lubricating oil from a radially inner position to the friction plates. More specifically, the multiple disk clutch includes first and second components, first and second friction plates, a piston, a return spring, a spring retainer and a thrust washer.

The first component has a first cylindrical portion. The second component is rotatably arranged relative to the first component, and has a second cylindrical portion coaxially arranged with and radially located inside of the first cylindrical portion. The second component is provided with a plurality of radial through apertures for allowing the lubricating oil to engage the friction plates. The first and second friction plates are non-rotatably and axially movably coupled to the first and second cylindrical portions, respectively. The first and second friction plates are alternately arranged in an axial direction between the first and second cylindrical portions. The piston is used for pressing the first and second friction plates together by hydraulic pressure. The return spring is used for biasing the piston away from the first and second friction plates. The spring retainer is fixed to one of the first and second rotary members, and retains the return spring. Oil passages allowing radial movement of the lubricating oil are formed between axially opposed portions of the first and second components. These oil passages are located radially inside the second cylindrical portion. The thrust washer has a support portion arranged between the axially opposed portions, and a guide portion for leading the lubricating oil flowing through the oil passage toward a position radially inside the second cylindrical portion.

The lubricating oil, which is supplied from a radially inner position of the multiple disk clutch, is directed to the position radially inside the second cylindrical portion by the guide portion of the thrust washer. The lubricating oil is then supplied onto the first and second friction plates through the radial apertures extending through the second cylindrical portion. The guide portion of the thrust washer ensures that a large amount of lubricating oil can be supplied onto the first and second friction plates to reduce overheating and abnormal abrasion of the first and second friction plates. Since the thrust washer, which is an existing part of the multiple clutch is used for guiding the lubricating oil, additional parts are unnecessary. Thus, the structure of the multiple clutch can be kept simple.

The foregoing and other objects, features, aspects and advantages of the present invention will become more apparent from the following detailed description, when taken in conjunction with the accompanying drawings.

BRIEF DESCRIPTION OF THE DRAWINGS

FIG. 7b is a right side elevational view of the carrier illustrated in FIGS. 1, 6 and 7a;

DESCRIPTION OF THE PREFERRED EMBODIMENTS

Figure 1:
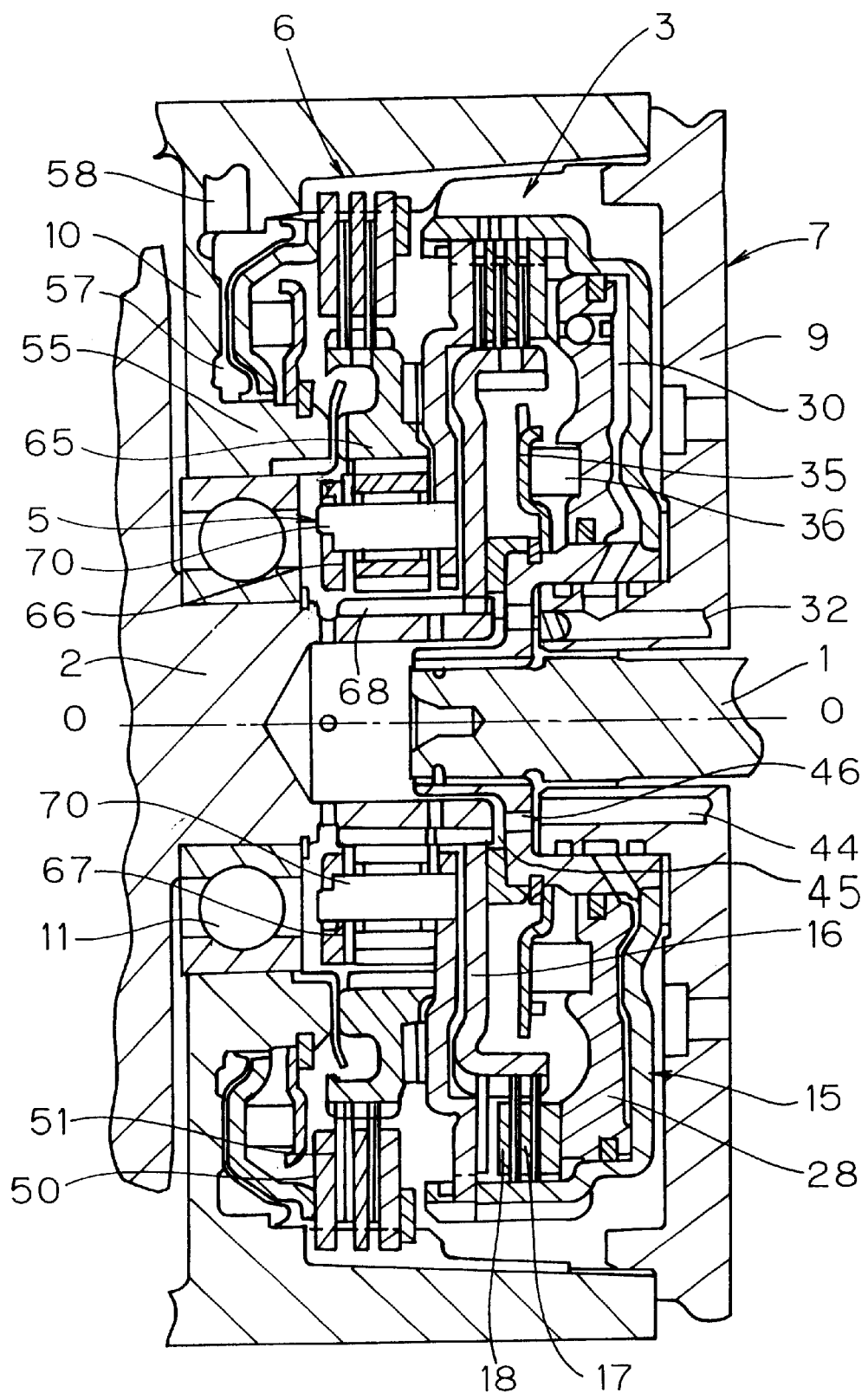
FIG. 1 is a fragmentary, cross-sectional view of an automatic transmission utilizing a pair of multiple disk clutches in accordance with one embodiment of the present invention, with structure for directing the lubricating oil to the friction plates.

Referring initially to FIG. 1, a cross-sectional view of an automatic transmission employing a pair of multiple disk clutches 3 and 6 in accordance with one embodiment of the present invention is illustrated. The transmission shown in FIG. 1 includes an input shaft 1 and an output shaft 2 which are coaxial with each other. A first multiple disk clutch 3 is coupled to input shaft 1 and extends radially outwardly from the input shaft 1. A planetary gear mechanism 5 is coupled to the output shaft 2 and extends radially outwardly from the output shaft 2. A second multiple disk clutch 6 is coupled to the planetary gear mechanism 5 and extends radially outwardly from the planetary gear mechanism 5.

The multiple disk clutches 3 and 6 as well as the planetary gear mechanism 5 are located inside a housing assembly 7. The input shaft 1 extends into housing assembly 7 through an aperture formed in an end wall 9 of the housing assembly 7 such that the inner end of input shaft 1 has first multiple disk clutch 3 coupled thereto. The output shaft 2 extends into the housing assembly 7 through a bearing aperture at the other end wall 10 of the housing assembly 7. The output shaft 2 is rotatably coupled in the bearing aperture by a bearing 11.

Figure 2:
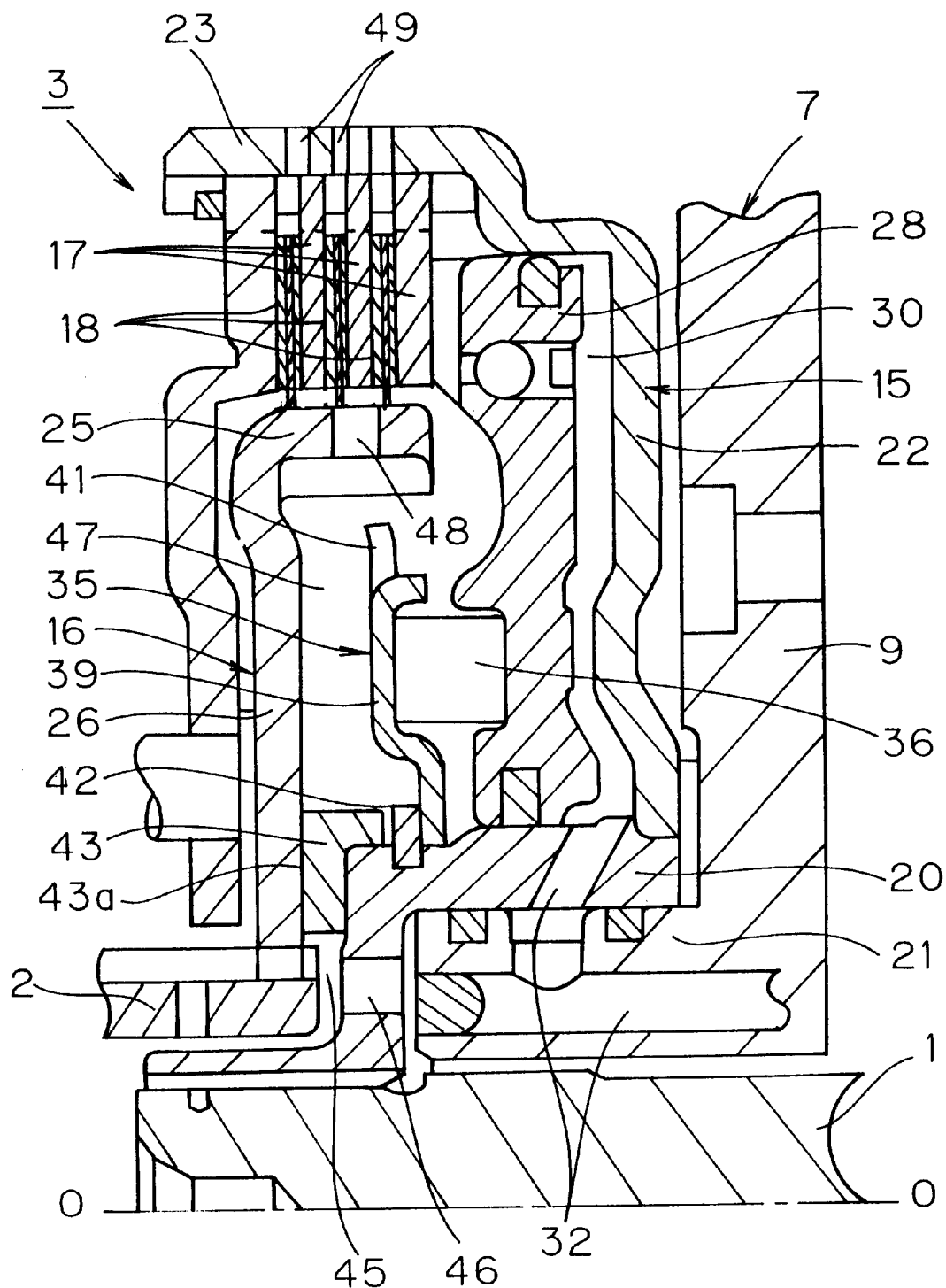
FIG. 2 is an enlarged, partial cross-sectional view of the automatic transmission showing an upper portion of the right or first multiple disk clutch illustrated in FIG. 1.

Turning now to FIG. 2, an enlarged portion of the upper section of the first multiple disk clutch 3 is shown. The first multiple disk clutch 3 includes an input member or assembly 15, an output member 16, a plurality of input or first friction plates 17 and a plurality of output or second friction plates 18.

The input member or assembly 15 (first member) is fixed at its inner periphery to the outer periphery of the input shaft 1 through spline teeth for rotation therewith. The input assembly 15 has an inner cylindrical portion 20, which is located near the inner periphery of the input assembly 15, an annular portion 22 extending radially outwardly from the cylindrical portion 20 and a first outer cylindrical portion 23 coupled to the outer peripheral end of the annular portion 22. The cylindrical portion 20 is rotatably mounted around a cylindrical portion 21 extending from the end wall 9. An oil seal is located between the interface of cylindrical portions 20 and 21 for creating a seal therebetween. An inner periphery of an annular portion 22 of the input assembly 15 is fixed to the outer periphery of the end of the inner cylindrical portion 20 adjacent to the end wall 9. The annular portion 22 extends substantially radially from the inner cylindrical portion 20. The first outer cylindrical portion 23 is integrally coupled to the outer periphery of the annular portion 22 as a one-piece, unitary member. The first outer cylindrical portion 23 extends axially from the outer periphery of the annular portion 22 away from the end wall 9.

The first (input) and second (output) friction plates 17 and 18 of the first multiple disk clutch 3 are located radially inside the first outer cylindrical portion 23, and alternate axially relative to each other. Each of the input or first friction plates 17 is provided at its outer periphery with claws which engage axial grooves formed at the inner periphery of the first outer cylindrical portion 23 so that each first friction plate 17 is axially movably and relatively non-rotatably coupled to the first outer cylindrical portion 23 of the input assembly 15.

The output member 16 (second member) is provided at its outer peripheral portion with a second outer cylindrical portion 25 which is spaced radially inwardly from the first outer cylindrical portion 23 of the input assembly 15. Claws formed at the inner periphery of each second friction plate 18 are engaged with axial grooves (FIG. 1) formed at the outer periphery of the second outer cylindrical portion 25 so that each second friction plate 18 is movably coupled to the output member 16 in an axial direction but non-rotatably coupled to the output member 16. The output member 16 is provided with an annular portion 26 which extends radially inward from the end of the second outer cylindrical portion 25 remote from the end wall 9. The inner periphery of the annular portion 26 is coupled to the outer periphery of the end of the output shaft 2 through spline teeth.

As seen in FIGS. 1 and 2, a piston or pressure plate 28 is axially arranged between the annular portion 22 of the input assembly 15 and the output member 16. The pressure plate 28 has an outer portion with one of its radial faces positioned adjacent to one of the first friction plates 17. The pressure plate 28 is slidably fitted at its outer periphery to the inner peripheral surface of the first outer cylindrical portion 23 of the input assembly 15. An oil seal is positioned between the interface of the first outer cylindrical portion 23 and the pressure plate 28 for creating a seal therebetween. The pressure plate 28 is also slidably fitted at its inner periphery to the outer periphery of the inner cylindrical portion 20 of the input assembly 15. An oil seal is positioned between the inner cylindrical portion 20 and the pressure plate 28 for creating a seal therebetween. A working fluid chamber 30 is formed between the pressure plate 28 and the input assembly 15. The working fluid chamber 30 is connected to a hydraulic pressure control mechanism (not shown) arranged at an external position through an oil passage 32 formed at the end wall 7 and other oil passages (not shown).

A spring retaining member 35 is arranged between the pressure plate 28 and the annular portion 26 of the output member 16. The spring retaining member 35 is formed of an annular plate extending substantially radially from inner cylindrical portion 20 of input assembly 15. A return spring 36 is interposed between the spring retaining member 35 and the pressure plate 28. Although not show clearly, the return spring 36 is made of a spring strip having a wavy section, and extends spirally around the inner cylindrical portion 20 as a whole. Therefore, the return spring 36 is retained by the spring retaining member 35, and biases the pressure plate 28 away from the first friction plate 17.

Figure 3:
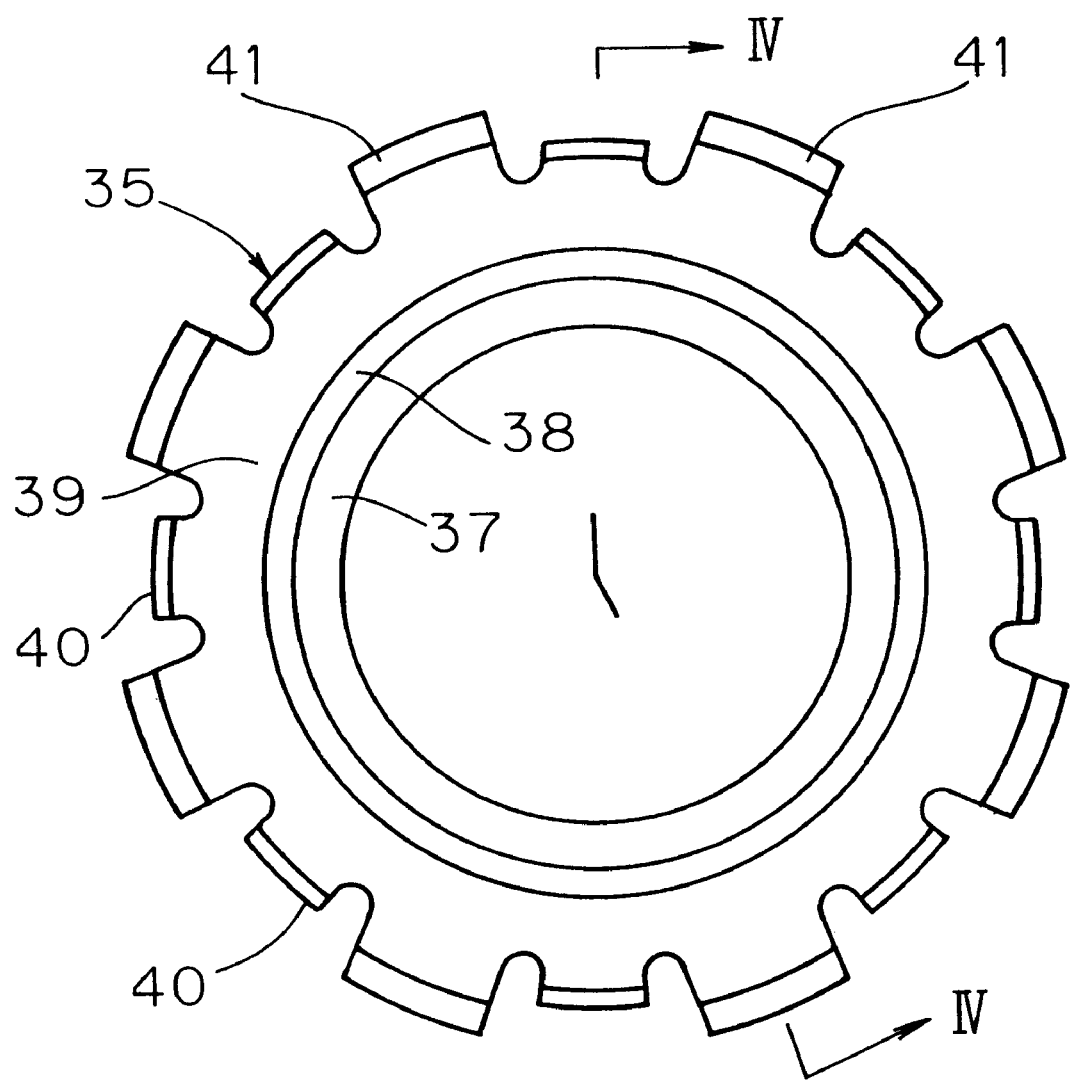
FIG. 3 is a right side elevational view of a spring retainer of the right or first multiple disk clutch illustrated in FIGS. 1 and 2.
Figure 4:
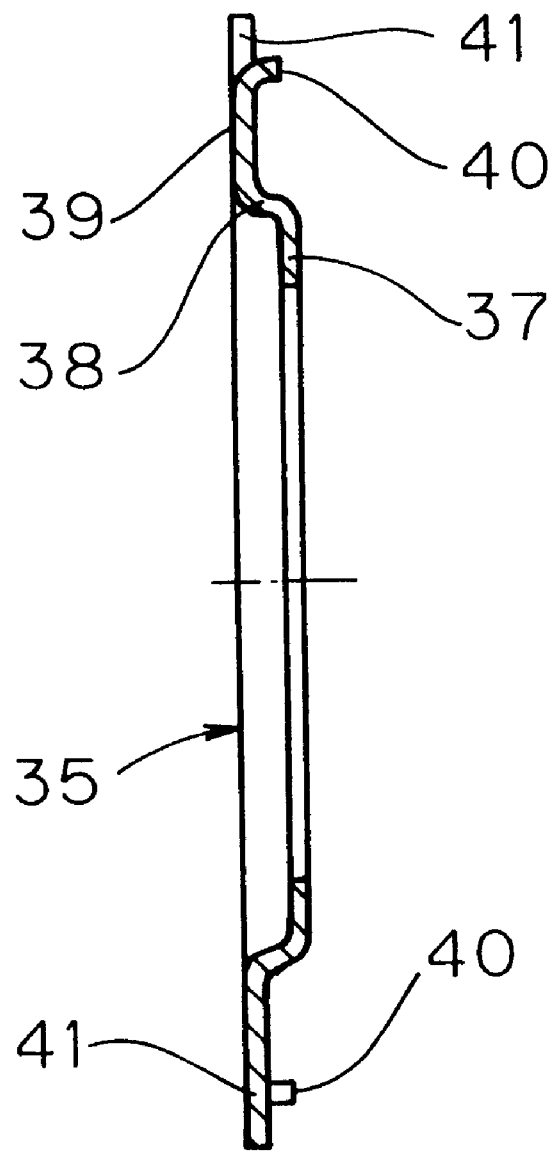
FIG. 4 is a cross-sectional view of the spring retainer illustrated in FIG. 3 taken along line IV—IV in FIG. 3.

Referring now to FIGS. 3 and 4, right end elevational view of the spring retaining member 35 is shown in FIG. 3, and a cross-sectional view of the spring retaining member 35 is shown in FIG. 4 as viewed along line IV—IV in FIG. 3. As can be seen from FIGS. 3 and 4, the spring retaining member 35 includes an inner portion 37, a curved portion 38, an annular seat portion 39, curved portions 40 and guide portions 41. Inner portion 37 of retaining member 35 defines a circular opening at its inner periphery for mounting on the inner cylindrical portion 20 of input assembly 15 as seen in FIGS. 1 and 2. The curved portion 38 of the spring retaining member 35 extends from the outer periphery of the inner portion 37 and curves away from the pressure plate 28 as seen in FIG. 2. Annular spring seat portion 39 extends radially outwardly from the curved portion 38, with the outer periphery of annular spring seat portion 39 having curved portions 40 guide portions 41 coupled thereto. The curved portions 40 extend from the outer periphery of the spring seat portion 39 toward the pressure plate 28 as seen in FIG. 2. The return spring 36, as seen in FIG. 2, has an end seated on the spring seat portion 39, and is prevented from shifting in a radial direction by the curved portions 38 and 40 as seen in FIGS. 3 and 4.

As seen in FIG. 3, eight curved portions 40 are formed at the outer periphery of the spring seat portion 39 such that the curved portions 40 are circumferentially spaced apart from each other. Guide portions 41 are arranged between adjacent curved portions 40 in an alternating fashion. In other words, the plurality of curved portions 40 and the plurality of guide portions 41 alternate relative to each other at the outer periphery of the spring seat portion 39. Each guide portion 41 is designed (sized and shaped) for guiding the lubricating oil towards the friction plates 17 and 18, as will be described later. Specifically, guide portions 41 extend radially outward from the outer periphery of the spring seat portion 39 so that the lubricating oil is centrifugally guided towards the friction plates 17 and 18.

Referring again to FIG. 2, the inner periphery of the spring retaining member 35 is supported from the side remote from the pressure plate 28 by a snap ring 42 fixed to the outer periphery of the inner cylindrical portion 20 of input assembly 15. A thrust bearing 43 is arranged between the radially inner portion of the output member 16 and the end of the cylindrical portion 20 opposed thereto.

Referring now to FIGS. 1 and 2, an annular space 45 is formed radially inside the thrust bearing 43. The inner cylindrical portion 20 of input assembly 15 is provided with an oil passage 46 communicating with the annular space 45. The housing assembly 7 is provided at the cylindrical portion 21 with an oil passage 44 which communicates with the oil passage 46. Oil passage 44 is different from the foregoing oil passage 32 for the working fluid. The thrust bearing 43 is provided at the radially facing surface, which is in contact with the output member 16, with a plurality of grooves 43a (oil passages) extending radially therethrough. Each groove 43a connects the annular space 47 containing the spring retaining member 35 to the annular space 45.

The output member 16 is provided at the second outer cylindrical portion 25 with a plurality of oil apertures 48 which extend radially between the inner and outer peripheries of the second outer cylindrical portion 25. The oil apertures 48 are preferably circumferentially and equally spaced from each other about the second outer cylindrical portion 25. Preferably, the second outer cylindrical portion 25 has at least eight oil apertures 48 with each oil aperture 48 being aligned with one of the guide portions 41. Of course, fewer or more oil apertures 48 can be provided as needed. The radial surfaces of the guide portions 41 which radially face the pressure plate 28 are substantially aligned radially with portions of edges of the oil apertures 48 near the pressure plate 28. As shown in FIG. 3, the guide portions 41 are preferably equally and circumferentially spaced from each other. Accordingly, guide portions 41 are located radially inside the oil apertures 48 in FIG. 2, respectively, with each guide portion 41 aligning with one of the oil apertures 48.

Figure 5:
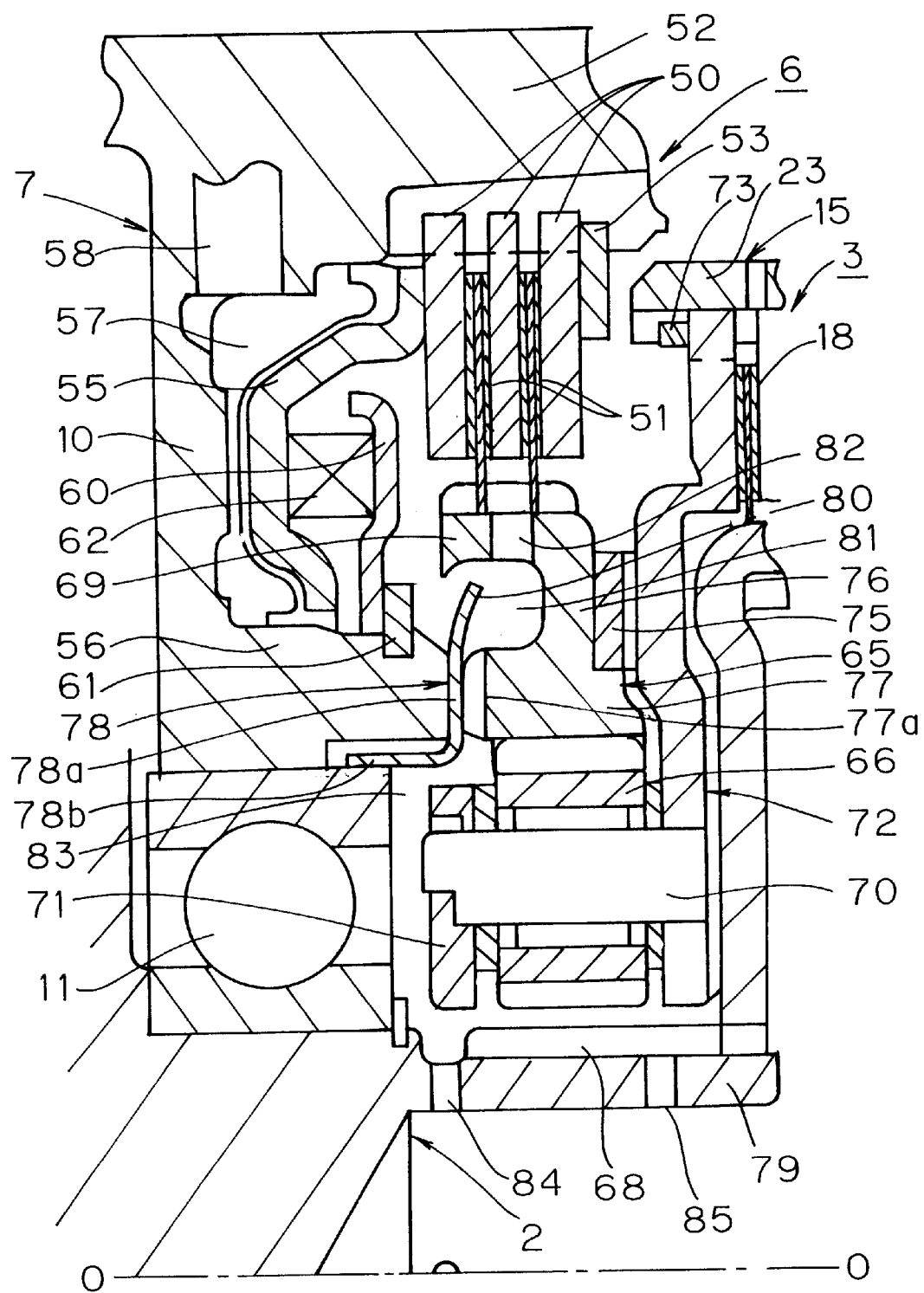
FIG. 5 is an enlarged, partial cross-sectional view of the automatic transmission showing the upper portion of the left or second multiple disk clutch illustrated in FIG. 1.

Referring to FIG. 5, the planetary gear mechanism 5 and the multiple disk clutch 6 will now be described below in more detail. The multiple disk clutch 6 forms a brake, and therefore includes two kinds of friction plates, i.e., three stationary first friction plates 50 and two rotatable second friction plates 51 arranged between the plates 50. Each first friction plate 50 is provided at its outer periphery with claws, which movably engage grooves formed at the inner periphery of an outer peripheral wall 52 (first cylindrical portion or first component) of the housing assembly 7 for allowing axial movement but not rotational movement.

A stop plate 53 supports the first friction plate 50 which is farthest from the end wall 10. More specifically, the stop plate 53 supports the surface of this end friction plate 50 remote from the second friction plate 51. The stop plate 53 has an outer peripheral portion which is fixedly engaged with a groove at the inner periphery of the outer peripheral wall 52.

A radially outer portion of a pressure or piston plate 55 (piston) engages the first friction plates 50 nearest to the end wall 10. More specifically, the piston plate 55 engages a radial surface of the end friction plate 50 remote from the second friction plate 51. The outer periphery of the piston plate 55 is slidably fitted to the inner periphery of the outer peripheral wall 52. The inner periphery of the piston plate 55 is slidably fitted to the outer periphery of a cylindrical portion 56 integrally projected from the end wall 10. The working fluid chamber 57 is formed between the end wall 10 and the piston plate 55. The working fluid chamber 57 is connected to a hydraulic pressure control mechanism (not shown) through an oil passage 58 formed at the outer peripheral wall 52 and others.

The cylindrical portion 56 has a portion, which projects beyond the piston plate 55, and carries an inner periphery of an annular spring retainer 60 fixed thereto by a snap ring 61. A return spring 62 is arranged between the snap ring 61 and the piston plate 55. The return spring 62 has a structure similar to that of the return spring 36 already described with reference to FIG. 2.

The planetary gear mechanism 5 includes a ring gear, i.e., a spline hub 65, two kinds of pinions 66 and 67 (planet gears) (FIG. 1), and a sun gear 68. The ring gear or spline hub 65 is coaxially mounted about output shaft 2 which has the sun gear 68 fixedly coupled thereto. The ring gear or spline hub 65 is operatively coupled to the sun gear 68 by pinions 66 and 67. The spline hub 65 (second component) serves also as a component of the multiple disk clutch 3, and has a second cylindrical portion 69 at its outer periphery. Claws at the inner periphery of the second friction plate 51 are engaged with grooves which are formed at the outer periphery of the second cylindrical portion 69 so that the second friction plate 51 is axially slidably and relatively non-rotatably coupled to the spline hub 65.

The sun gear 68 is formed of a cylindrical portion 79 formed at the end of the output shaft 2. The plurality of pinions 66 (only one is shown) and the plurality of pinions 67 (only one is shown in FIG. 1) are arranged circumferentially and alternately relative to each other in an annular space between the spline hub 65 and the sun gear 68. The pinions 66 are in mesh with the inner teeth of the spline hub 65 forming the ring gear. The other pinions 67 shown in FIG. 1 are in mesh with the outer teeth of the sun gear 68.

The pinions 66 and 67 are carried by pinion shafts 70 parallel to the input shaft 1 through bearings, respectively. Each pinion shaft 70 is fixed at its opposite ends to annular carriers or carrying members 71 and 72, respectively. The carrier 71 is formed of an annular plate having a relatively small radial width. The carrier 72 has an outer diameter larger than that of the carrier 71, and specifically has the following structure.

The radially outer portion of the carrier 72 is in contact with the second friction plate 18 of the multiple disk clutch 3 nearest to the end wall 10. The carrier 72 is provided at its outer periphery with claws which are engaged with axial grooves formed at the inner periphery of the first outer cylindrical portion 23 of the input assembly 15. A snap ring 73 is attached to the inner periphery of the free end of the first cylindrical outer portion 23 for preventing movement of the carrier 72 away from the second friction plate 18.

A radially middle portion of the carrier 72 is in axial contact with a radially middle portion 76 of the spline hub 65 through a thrust bearing 75.

A cylindrical inner peripheral portion 77 of the spline hub 65 and more specifically an end surface thereof remote from the carrier 72 is in contact with the end surface of the cylindrical portion 56 of the housing assembly 7 through a thrust washer 78.

The thrust washer 78 includes a support portion 78a, a cylindrical middle portion 78b and an outer cylindrical guide portion 80. Support portion 78a extends radially through a position between the cylindrical inner peripheral portion 77 and the cylindrical portion 56, and an annular extension which projects outward from the support portion 78a and forms a guide portion 80. The guide portion 80 of the thrust washer 78 defines an annular space 81 together with the middle portion 76 of the spline hub 65. The guide portion 80 of the thrust washer 78 is slightly inclined such that it approaches the edge portions of oil apertures 82 near the end wall 10 as the position moves radially outward. In other words, the radial surface of guide portion 80 which faces middle portion 76 of spline hub 65 has its outer peripheral edge substantially aligned with the edges of the oil apertures 82 which are closest to the end wall 10. The cylindrical portion 78b of thrust washer 78 extends from the inner periphery 65 of the support portion 78a away from the spline hub 65. The cylindrical portion 78b is in contact with the outer peripheral surface of the outer race of the bearing 11.

The oil apertures 82 are formed at the second cylindrical portion 69 of the spline hub 65 surrounding the outer periphery of the space 81. More specifically, the oil apertures 82 are circumferentially spaced apart from each other along the circumference of the portion 69. The oil apertures radially connect the axial grooves at the outer periphery of the second cylindrical portion 69 to the space 81, respectively.

The spline hub 65 is provided at the end surface of the inner peripheral portion 77 with a plurality of grooves 77a (oil passages) connecting a space 83 radially inside the inner peripheral portion 77 to the space 81. The space 83 is in communication with the oil passage 46 (FIG. 1) through oil passages 84 and 85 formed at the cylindrical portion 79 of the output shaft 2.

Each of the pinion shafts 70 is fixed to the carrier 72 by fitting and caulking the cylindrical end of the pinion shaft 70 into a circular aperture at the carrier 72. In the illustrated embodiment, the structure for fixing the pinion shaft 70 and the carrier 71 together is devised as follows.

Figure 6:
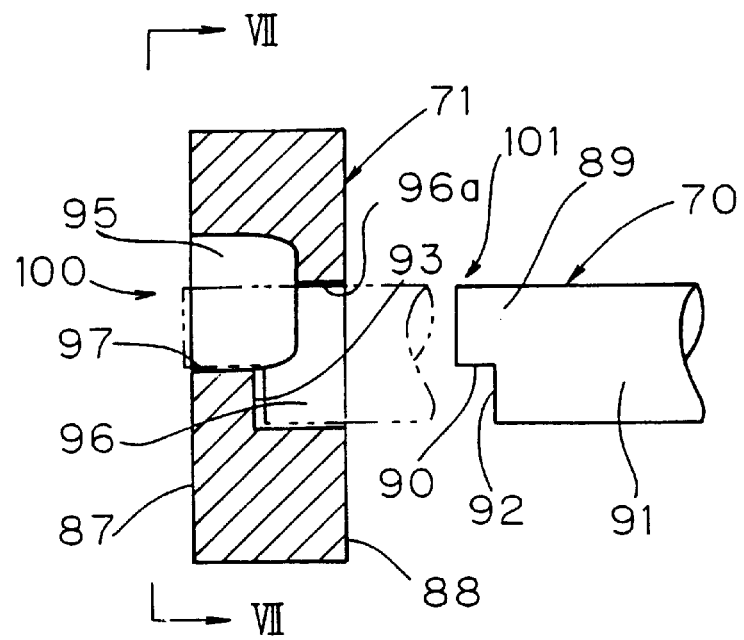
FIG. 6 is an enlarged, partial cross-sectional view of a pinion and a carrier illustrated in FIG. 1 before assembly, and with the pinion shown in broken lines after assembly.
Figure 7A:
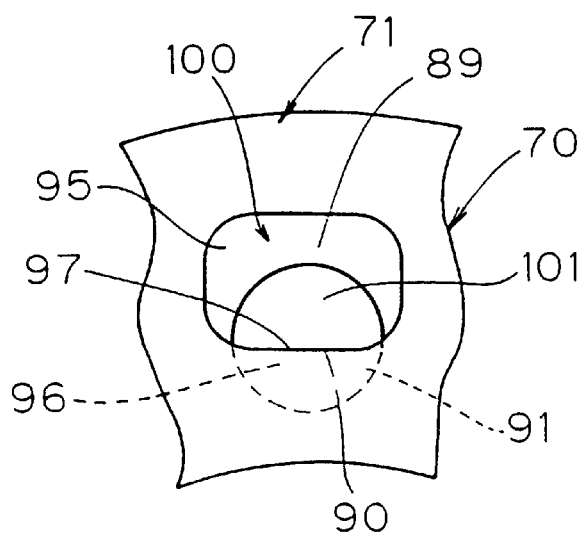
FIG. 7a is an enlarged, partial left side elevational view of a portion of the carrier and pinion illustrated in FIGS. 1 and 6 as viewed along line VII—VII in FIG. 6.

As seen in FIG. 6, the pinion shaft 70 and the carrier 71 are illustrated in an exploded state with the pinion shaft 70 shown in broken lines to illustrate the assembled position. FIG. 7a is a view taken along line VII—VII in FIG. 6. In these figures, the pinion shaft 70 having an outer peripheral surface 91 which is cylindrical in form, and has a circular cross-section for rotatably supporting pinion 66. The outer periphery of the end of the pinion shaft 70 is partially recessed to form a semicircular or nearly D-shaped end section. In other words, the pinion shaft 70 is provided at its end with a projection 101 which is partially and linearly recessed. The outer peripheral surface of the projection 101 is formed of a partially cylindrical surface 89 and a flat surface 90 (rotation stop). The partially cylindrical portion 89 has a section which extends circularly through an angle over 180 degrees. The end portion of the pinion shaft 70 other than the projection 101 forms an end surface 92.

Figure 7B:
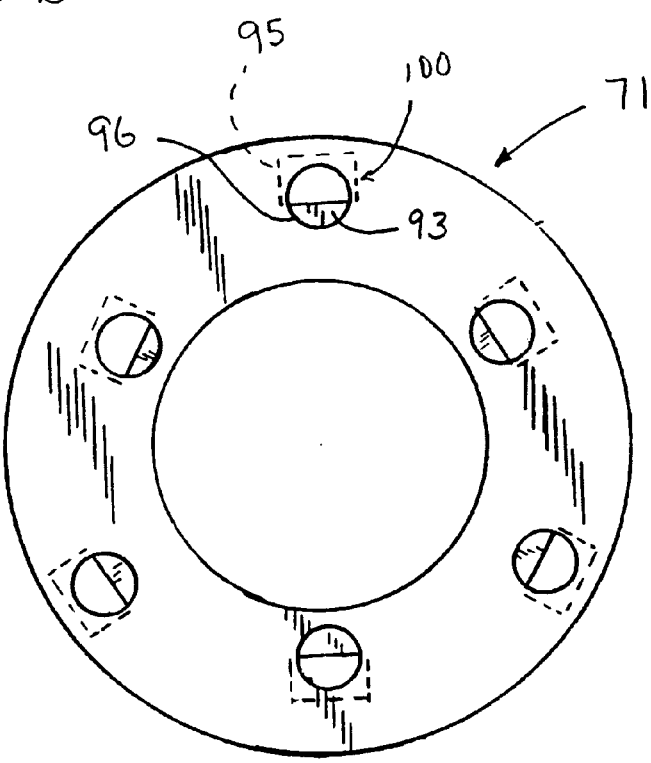
Figure 7C:
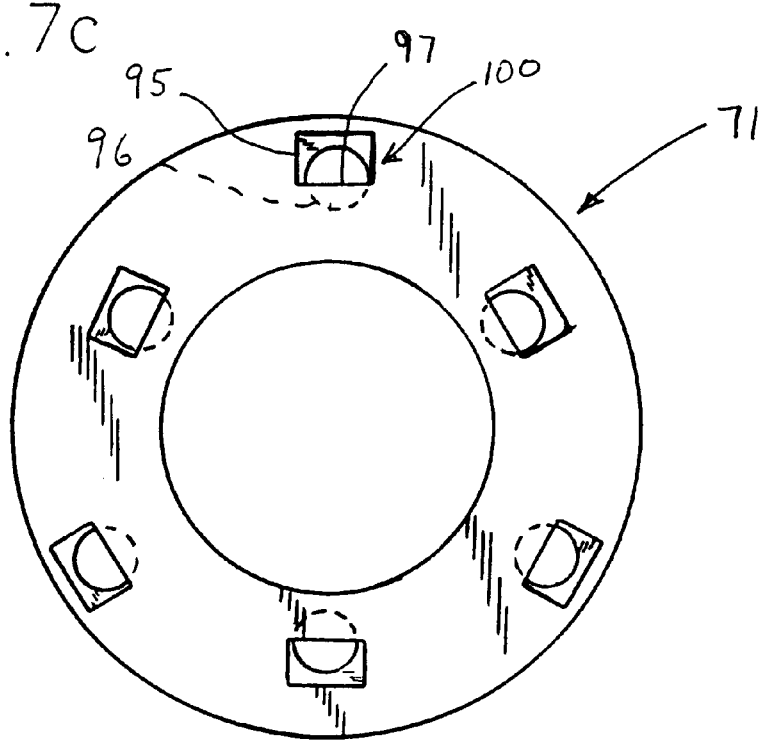
FIG. 7c is a left side elevational view of the carrier illustrated in FIGS. 1, 6, 7a and 7b.

As seen in FIGS. 7b and 7c, the carrier 71 is provided with a plurality of fixing apertures 100 into which ends of the pinion shafts 70 are fixed with anti-rotation structures, respectively. A first set of fixing apertures 100 are arranged in a first substantially circular pattern for receiving pinion shafts 70 of pinions 66, and a second set of fixing apertures 100 are arranged in a second substantially circular pattern of a smaller diameter than the first pattern for receiving pinion shafts 70 of pinions 67. While six fixing apertures 100 are illustrated, it will be apparent to those skilled in the art that carrier 71 can be provided with more fixing apertures if more than three pinions 66 and/or more than three pinions 67 are used. Each fixing aperture 100 is formed of first and second concavities 95 and 96 having bottoms continuous to each other. The first and second concavities 95 and 96 have different forms and are shifted from each other. Therefore, each fixing aperture 100 has a stepped portion at its inner periphery. The first concavity 95 is formed in the first radial surface 87 of the carrier 71, and the second concavity 96 is formed in the other or second radial surface 88.

The first concavity 95 is substantially rectangular in a plan view, and has a flat rotation stop surface 97 contacting the flat surface 90 (rotation stop) of the projection 101 of the pinion shaft 70. When the pinion shaft 70 is engaged with the carrier 71, a gap is kept between the inner peripheral surface of the first cavity 95 and the partially cylindrical surface 89 of the pinion shaft 70. The second concavity 96 is formed at the second radial surface 88 of the carrier 71 near the pinion shaft 70. The second concavity 96 is circular in a plan view, and has the substantially same diameter as the outer peripheral surface 91 of the pinion shaft 70. The second concavity 96 is partially overlapped with the first concavity 95. Overlapped portions of the first and second concavities 95 and 96 extend axially through the carrier 71. Portions of the first and second concavities 95 and 96 which are not overlapped with each other form radial end surfaces, respectively. The radial end surface 93 of the second concavity 96 is complementary in shape and position with the end surface 92 of the pinion shaft 70. Thus, the portion of the second concavity 96 communicated with the first concavity 95 has a D-shaped section which is complementary with that of the projection 101 of the pinion shaft 70.

The carrier 71 of the above structure is processed as follows. First, press working (stamping or embossing) is performed on a sheet material, preferably a metal plate, to finish the shape of the carrier 71 other than the second concavities 96 into the form having a predetermined size and shape. This press working forms concavities at the first radial surface 87, which forms the first concavities 95. Then, the stamped sheet material is milled or otherwise cut to remove material from the second radial surface 88 to form the circular second concavities 96 reaching the bottoms or radial end surfaces of the first concavities 95. In this manner, the fixing apertures 100 are completed by pressing concavities 95 and milling concavities 96. In an assembly operation, the pinion shafts 70 are then fitted into the fixing apertures 100. Then, pinion shafts 70 are fixedly secured to carrier 71 by caulking to keep the relative positions already described. Pinion shafts 70 can be sized to be frictionally secured within fixing apertures if needed and/or desired.

Specifically, the pinion shafts 70 are coupled to the carrier 71 by moving the pinion shafts 70 from positions opposed to the second radial surface 88 of the carrier 71 and into the concavities 96. The projections 101 of pinion shafts 70 are moved through the second concavities 96, and are inserted into the first concavities 95. When the projections 101 are fitted as shown by the broken lines in FIG. 6, the flat surfaces 90 are in contact with the rotation stop surfaces 97 of the second concavities 96. The outer peripheral surfaces 91 of the pinion shafts 70 are in contact with the inner peripheral surfaces 96a of the second concavities 96, and the end surfaces 92 are in contact with the bottom or end surfaces 93.

The pinion shafts 70 are unmovable with respect to the carrier 71 owing to close fitting of its columnar portion into the second concavity 96, and are non-rotatable with respect to the carrier 71 due to contact of the flat surfaces 90 with the rotation stop surfaces 97. The pinion shafts 70 are axially positioned with respect to the carrier 71 owing to contact of the end surfaces 92 with the bottom or end surfaces 93.

An operation will now be described below. As seen in FIG. 1, when the pressure in the working fluid chamber 30 is increased by the working fluid supplied thereto through the oil passage 32, the pressure plate 28 presses the first and second friction plates 17 and 18 together so that the multiple disk clutch 3 is engaged. In this state, a torque transmitted from the input shaft 1 to the input assembly 15 is transmitted to the output member 16 through the friction plates 17 and 18. The torque from the input shaft 1 is further transmitted from the output member 16 to the output shaft 2.

When the pressure in the working fluid chamber 30 is released, the return spring 36 pushes and returns the pressure plate 28 toward the end wall 9 so that the first and second friction plates 17 and 18 are released from each other, and the multiple disk clutch 3 is disengaged. Even in this state, the torque transmitted from the input shaft 1 to the input assembly 15 is transmitted to the carrier 72 through the first outer cylindrical portion 23 of the input assembly 15 as shown in FIG. 5.

In the multiple disk clutch 6 shown in FIG. 5, the piston plate 55 presses the first and second friction plates 50 and 51 to each other when the working fluid in the working fluid chamber 57 is pressurized. When the multiple disk clutch 6 is engaged in this manner, the spline hub 65 is fixed to the outer peripheral wall 52. Accordingly, the pinion assembly formed of the pinions 66 and 67 and the carriers 71 and 72 rotates together with the input assembly 15, and the torque of the input assembly 15 is transmitted to the output shaft 2 through the pinion 67.

In the above operation, the lubricating oil is supplied from the oil passage 44 in FIG. 1 to the annular space 45 through the oil passage 46 in FIG. 2. The lubricating oil flows into the space 47 through the grooves 43a between the thrust bearing 43 and the output member 16, further reaches the inner periphery of the second cylindrical portion 25, and then flows through the oil apertures 48 to the surfaces of the first and second friction plates 17 and 18. Thereby, overheating and abnormal abrasion of the surfaces of the first and second friction plates 17 and 18 are prevented. The lubricating oil passed over the surfaces of the first and second friction plates 17 and 18 flows through the outer oil apertures 49, and is discharged outward therefrom.

In this lubricating operation, the lubricating oil flowing radially outward through the space 47 is guided by the guide portions 41 of the spring retaining member 35 to the oil apertures 48. Therefore, the amount of the lubricating oil flowing into the oil apertures 48 increases so that the surfaces of the first and second friction plates 17 and 18 can be effectively lubricated.

In the multiple disk clutch 6 shown in FIG. 5, the first and second friction plates 50 and 51 are likewise lubricated effectively as described below. A part of the lubricating oil supplied from the oil passage 46 (FIG. 2) flows into the space inside the cylindrical portion 79 through the space between the end of the input shaft 1 and the cylindrical end portion 79, and partially flows through the oil aperture 85 formed at the cylindrical portion 79 to the pinions 66 and 67 and other portions for lubricating them.

The lubricating oil inside the cylindrical portion 79 also flows through the oil apertures 84 and 85 at the cylindrical portion 79 into the space 83 near the bearing 11. The lubricating oil then flows through the grooves 77a at the inner peripheral portion 77 into the space 81. The lubricating oil in the space 81 is guided by the guide portions 80 of thrust washer 78 so that the oil efficiently flows into the oil passages 82. The lubricating oil then flows from the oil passages 82 onto the surfaces of the first and second friction plates 50 and 51 for lubricating them. As described above, the guide portions 80 of the thrust washer 78 concentrate the lubricating oil to the oil passages 82 so that overheating and abnormal abrasion of the first and second friction plates 50 and 51 are effectively prevented.

Figure 8:
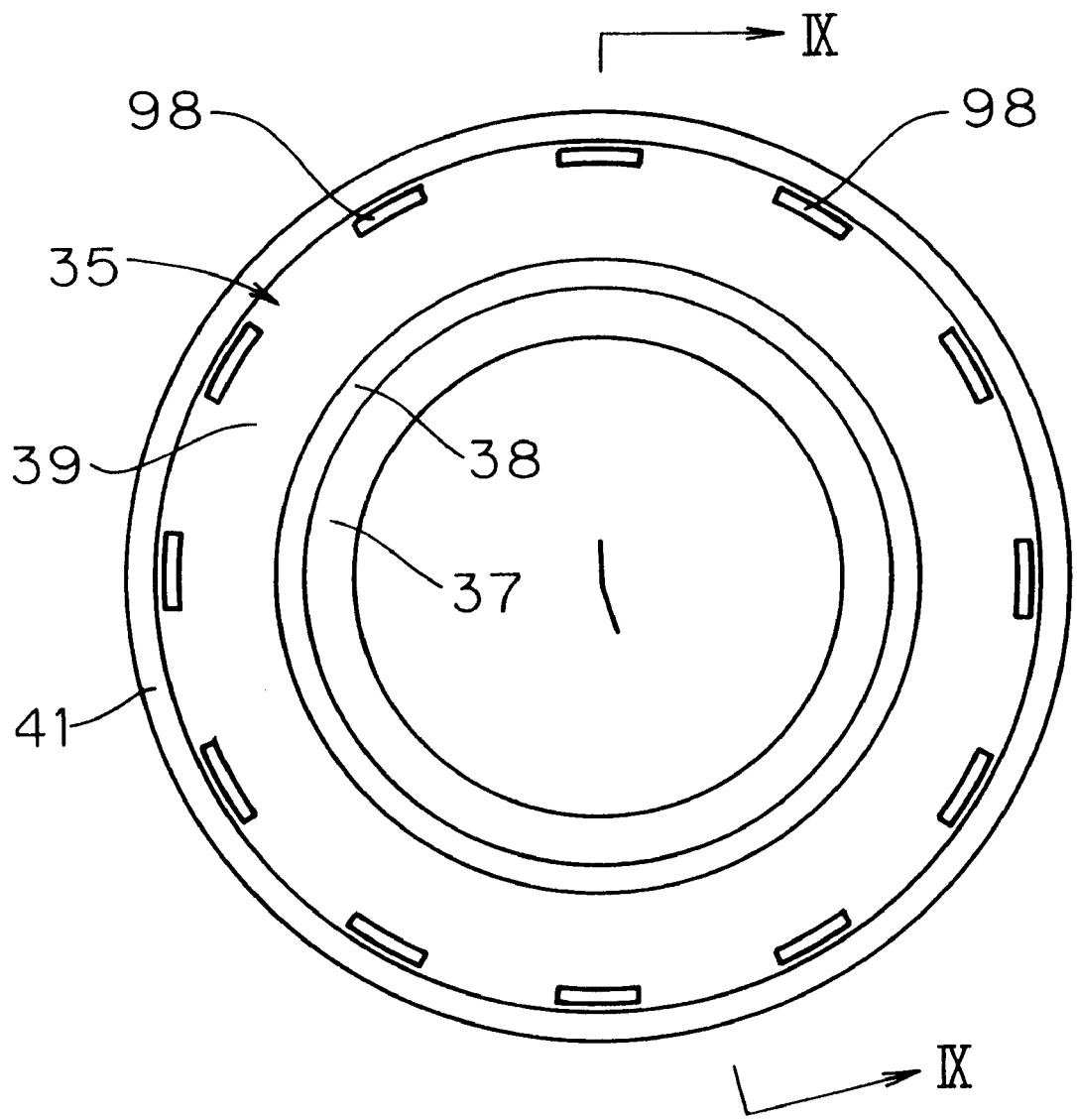
FIG. 8 is a right side elevational view of an alternate spring retainer in accordance with another embodiment of the present invention.
Figure 9:
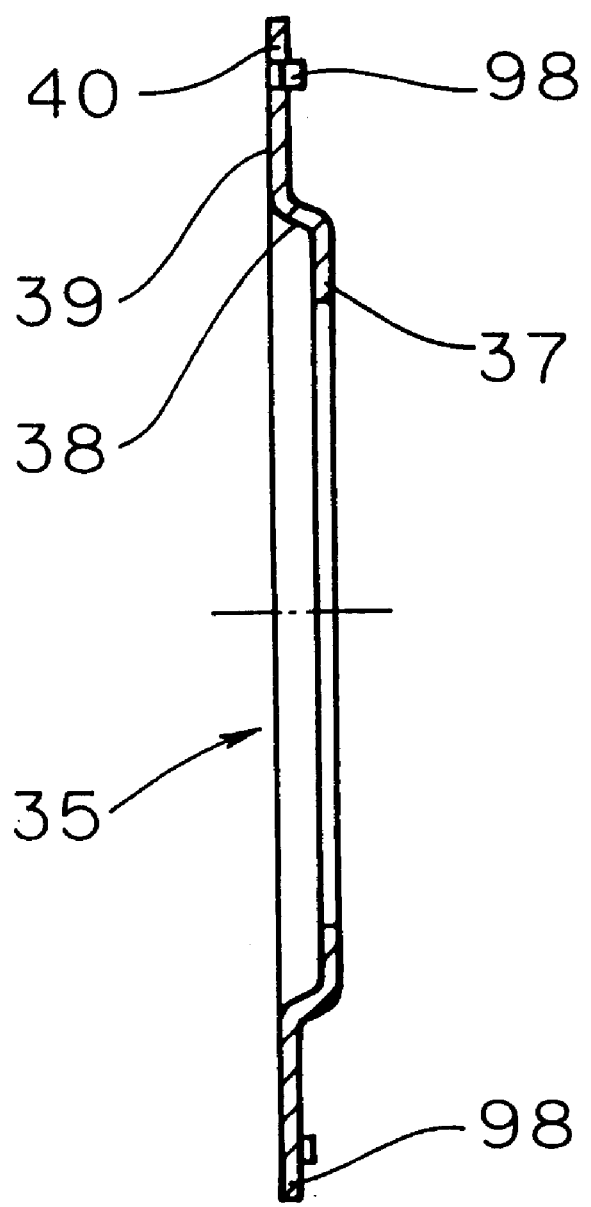
FIG. 9 is a cross-sectional view of the alternate spring retainer illustrated in FIG. 8 taken along line IX—IX in FIG. 8.

In the foregoing embodiment, the guide portions 41 are arranged at a plurality of circumferentially spaced positions radially outside the spring retaining member 35 as shown in FIG. 3. Instead of this structure, the guide portion 41 can be a continuous flange extending through the entire circumference of the spring retaining member 35 as shown in FIG. 8. In this case, a plurality of circumferentially spaced projections 98 are formed by press working instead of the curved portions 40 for retaining the spring in FIG. 3.

According to the invention, as described above, the guide portions 41 formed at the spring retaining member 35 can effectively direct or guide the lubricating oil to the first and second friction plates 17 and 18 of the multiple disk clutch 3. Therefore, the amount of lubricating oil reaching the first and second friction plates 17 and 18 can be sufficiently increased. Since the guide portions 80 formed at the thrust washer 78 can effectively guide the lubricating oil to the first and second friction plates 50 and 51 of the multiple disk clutch 6, the amount of lubricating oil reaching the first and second friction plates 50 and 51 can be sufficiently increased. In the preferred embodiments disclosed herein, a dedicated member is not required as the member for guiding and leading the lubricating oil to the friction plates, i.e., the spring retaining member 35 or the thrust washer 78 is utilized for this purpose. Therefore, the preferred structure is not complicated by a separate dedicated member.

According to the invention described above, the carrier 71 is manufactured by pressing a metal member and the cutting the metal member to form the fixing apertures 100 (first and second concavities 95 and 96). Each fixing aperture 100 has the rotation stop surface 97 engaged with the flat surface 90 (rotation stop portion) formed at the pinion shaft 70. Therefore, the carrier 71 provided with the fixing apertures 100, which has the predetermined functions of stopping rotation and positioning, can be produced by a simpler method than the prior art employing casting.

In the multiple disk clutch according to the invention, the lubricating oil is directed to the selected portions of the clutch by portions of the parts which are also employed in the prior art. Accordingly, the effect of lubricating the clutch portion can be increased by a simple structure.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A multiple disk clutch comprising:

a first rotatable member having a first cylindrical portion;

a second rotatable member rotatably coupled to said first rotatable member, and having a second cylindrical portion coaxially arranged about said first cylindrical portion and radially positioned inside said first cylindrical portion, said second cylindrical portion further having at least one radial aperture;

first and second friction plates non-rotatably and axially movably coupled to said first and second cylindrical portions, respectively, with said first and second friction plates axially alternating between said first and second cylindrical portions;

a movable pressure plate for pressing said first and second friction plates together;

a return spring for biasing said pressure plate away from said first and second friction plates; and an oil lubricating member arranged radially inside and spaced from said second cylindrical portion to allow relative rotation therebetween, said oil lubricating member having a guide portion with a free end arranged adjacent to, but spaced from said second cylindrical portion for guiding the lubricating oil to said at least one radial aperture of said second cylindrical portion.

2. A multiple disk clutch according to claim 1, wherein said second cylindrical portion has a plurality of said at least one radial apertures circumferentially spaced apart from each other.

3. A multiple disk clutch according to claim 1, wherein said pressure plate is a piston arranged to be acted upon by hydraulic pressure to move said first and second friction plates together.

4. A multiple disk clutch comprising:

a first rotatable member having a first cylindrical portion;

a second rotatable member rotatably coupled to said first rotatable member, and having a second cylindrical portion coaxially arranged about said first cylindrical portion and radially positioned inside said first cylindrical portion, said second cylindrical portion further having at least one radial aperture;

first and second friction plates non-rotatably and axially movably coupled to said first and second cylindrical portions, respectively, with said first and second friction plates axially alternating between said first and second cylindrical portions;

a movable pressure plate for pressing said first and second friction plates together;

a return spring for biasing said pressure plate away from said first and second friction plates; and an oil lubricating member arranged radially inside said second cylindrical portion, and having a guide portion for guiding the lubricating oil to said at least one radial aperture of said second cylindrical portion, said oil lubricating member being formed as part of a spring retaining member with said guide portion coupled thereto.

5. A multiple disk clutch according to claim 4, wherein said second cylindrical portion has a plurality of said at least one radial apertures circumferentially spaced apart from each other, and said guide portion is formed by a plurality of inclined flanges which are angled towards said radial apertures.

6. A multiple disk clutch according to claim 5, wherein said first and second rotatable members have a plurality of oil passages formed therebetween.

7. A multiple disk clutch according to claim 4, wherein said return spring retainer is fixed to one of said rotatable members.

8. A multiple disk clutch comprising:

a first rotatable member having a first cylindrical portion;

a second rotatable member rotatably coupled to said first rotatable member, and having a second cylindrical portion coaxially arranged about said first cylindrical portion and radially positioned inside said first cylindrical portion, said second cylindrical portion further having at least one radial aperture;

first and second friction plates non-rotatably and axially movably coupled to said first and second cylindrical portions, respectively, with said first and second friction plates axially alternating between said first and second cylindrical portions;

a movable pressure plate for pressing said first and second friction plates together;

a return spring for biasing said pressure plate away from said first and second friction plates; and an oil lubricating member arranged radially inside said second cylindrical portion, and having a guide portion for guiding the lubricating oil to said at least one radial aperture of said second cylindrical portion, said oil lubricating member being a thrust washer axially located between said first and second rotatable members.

9. A multiple disk clutch according to claim 8, wherein
said second rotatable member is a ring gear which is part of a planetary gear mechanism having a sun gear, a set of first planet gears meshed with said sun gear and a set of second planet gears meshed with said ring gear with said first and second planet gears being connected via a carrier.

10. A multiple disk clutch according to claim 9, wherein
said carrier is operatively coupled to an input shaft and said sun gear being operatively coupled to an output shaft.

11. A multiple disk clutch according to claim 10, wherein
said carrier is connected to said input shaft by a clutch mechanism.

12. A multiple disk clutch according to claim 6, wherein
said first and second rotatable member has axially opposed portions located radially inside said second cylindrical portion with an oil passage for allowing radial movement of the lubricating oil.

13. A multiple disk clutch according to claim 12, wherein
said second cylindrical portion has a plurality of said at least one radial apertures circumferentially spaced apart from each other, and
said thrust washer has a support portion arranged between said axially opposed portions, and has said guide portion located radially outwardly of said support portion for leading the lubricating oil flowing through said oil passage toward a position radially inside said second cylindrical portion so that the lubricating oil can flow out of said radial apertures of said second cylindrical portion.

14. A fluid operated automatic transmission with lubricating oil centrifugally supplied from a radially inner position, comprising:
a first multiple disk clutch including
an input shaft,
a first rotatable member coupled to said input shaft, and having a first cylindrical portion,
a second rotatable member rotatably coupled to said first rotatable member, and having a second cylindrical portion coaxially arranged about said first cylindrical portion and radially positioned inside said first cylindrical portion, said second cylindrical portion further having at least one first radial aperture,
first and second friction plates non-rotatably and axially movably coupled to said first and second cylindrical portions, respectively, with said first and second friction plates axially alternating between said first and second cylindrical portions,
a first movable pressure plate for pressing said first and second friction plates together,
a first return spring for biasing said pressure plate away from said first and second friction plates, and
a first oil lubricating member arranged radially inside said second cylindrical portion, and having a first guide portion for guiding the lubricating oil to said at least one first radial aperture of said second cylindrical portion; and
a second multiple disk clutch including
an output shaft,
a third member coupled about said output shaft, and having a third cylindrical portion,
a fourth rotatable member rotatably coupled to said third member and operatively coupled to said second rotatable member to transmit torque between said second and fourth rotatable members, said fourth rotatable member having a fourth cylindrical portion coaxially arranged about said third cylindrical portion and radially positioned inside said third cylindrical portion, said fourth cylindrical portion further having at least one second radial aperture,
third and fourth friction plates non-rotatably and axially movably coupled to said third and fourth cylindrical portions, respectively, with said third and fourth friction plates axially alternating between said third and fourth cylindrical portions,
a second movable pressure plate for pressing said third and fourth friction plates together;
a second return spring for biasing said second pressure plate away from said third and fourth friction plates; and
a second oil lubricating member arranged radially inside said fourth cylindrical portion, and having a second guide portion for guiding the lubricating oil to said at least one second radial aperture of said fourth cylindrical portion.

15. A fluid operated automatic transmission according to claim 14, wherein
said second cylindrical portion has a plurality of said at least one first radial apertures circumferentially spaced apart from each other.

16. A fluid operated automatic transmission with lubricating oil centrifugally supplied from a radially inner position, comprising:
a first multiple disk clutch including
an input shaft
a first rotatable member coupled to said input shaft and having a first cylindrical portion,
a second rotatable member rotatable coupled to said first rotatable member, and having a second cylindrical portion coaxially arranged about said first cylindrical portion and radially positioned inside said first cylindrical portion, said second cylindrical portion further having at least one first radial aperture,
first and second friction plates non-rotatably and axially movably coupled to said first and second cylindrical portions, respectively, with said first and second friction plates axially alternating between said first and second cylindrical portions,
a first movable pressure plate for pressing said first and second friction plates together,
a first return spring for biasing said pressure plate away from said first and second friction plates, and
a first oil lubricating member arranged radially inside said second cylindrical portion, and having a first guide portion for guiding the lubricating oil to said at least one first radial aperture of said second cylindrical portion, said first oil lubricating member being formed as part of a spring retaining member with said first guide portion coupled thereto; and
a second multiple disk clutch including
an output shaft,
a third member coupled about said output shaft and having a third cylindrical portion,
a fourth rotatable member rotatably coupled to said third member, said fourth rotatable member having a fourth cylindrical portion coaxially arranged about said third cylindrical portion and radially positioned inside said third cylindrical portion, said fourth cylindrical portion further having at least one second radial aperture, third and fourth friction plates non-rotatably and axially movably coupled to said third and fourth cylindrical portions, respectively, with said third and fourth friction plates axially alternating between said third and fourth cylindrical portions, a second movable pressure plate for pressing said third and fourth friction plates together;

a second return spring for biasing said second pressure plate away from said third and fourth friction plates; and a second oil lubricating member arranged radially inside said fourth cylindrical portion, and having a second guide portion for guiding the lubricating oil to said at least one second radial aperture of said fourth cylindrical portion.

17. A fluid operated automatic transmission according to claim 16, wherein said second cylindrical portion has a plurality of said at least one first radial apertures circumferentially spaced apart from each other, and said first guide portion is formed by a plurality of inclined flanges which are angled towards said first radial apertures.

18. A fluid operated automatic transmission according to claim 17, wherein said second oil lubricating member is a thrust washer axially located between said first and second rotatable members.

19. A fluid operated automatic transmission according to claim 18, wherein said third member is a ring gear which is part of a planetary gear mechanism having a sun gear, a set of first planet gears meshed with said sun gear and a set of second planet gears meshed with said ring gear with said first and second planet gears being connected via a carrier.

20. A fluid operated automatic transmission according to claim 19, wherein said carrier is operatively coupled to an input shaft by said first multiple disk clutch and said sun gear being operatively coupled to an output shaft.

21. A fluid operated automatic transmission according to claim 18, wherein said fourth cylindrical portion has a plurality of said at least one second radial apertures circumferentially spaced apart from each other, and said second guide portion is formed by a plurality of inclined flanges which are angled towards said second radial apertures.

22. A fluid operated automatic transmission with lubricating oil centrifugally supplied from a radially inner position, comprising:

a first multiple disk clutch including
an input shaft,
a first rotatable member coupled to said input shaft, and having a first cylindrical portion,
a second rotatable member rotatably coupled to said first rotatable member, and having a second cylindrical portion coaxially arranged about said first cylindrical portion and radially positioned inside said first cylindrical portion, said second cylindrical portion further having at least one first radial aperture,
first and second friction plates non-rotatably and axially movably coupled to said first and second cylindrical portions, respectively, with said first and second friction plates axially alternating between said first and second cylindrical portions,
a first movable pressure plate for pressing said first and second friction plates together,
a first return spring for biasing said pressure plate away from said first and second friction plates, and
a first oil lubricating member arranged radially inside said second cylindrical portion, and having a first guide portion for guiding the lubricating oil to said at least one first radial aperture of said second cylindrical portion; and a second multiple disk clutch including
an output shalt,
a third member coupled about said output shaft, and having a third cylindrical portion,
a fourth rotatable member rotatably coupled to said third member, said fourth rotatable member having a fourth cylindrical portion coaxially arranged about said third cylindrical portion and radially positioned inside said third cylindrical portion, said fourth cylindrical portion further having at least one second radial aperture,
third and fourth friction plates non-rotatably and axially movably coupled to said third and fourth cylindrical portions, respectively, with said third and fourth friction plates axially alternating between said third and fourth cylindrical portions,
a second movable pressure plate for pressing said third and fourth friction plates together;
a second return spring for biasing said second pressure plate away from said third and fourth friction plates; and
a second oil lubricating member arranged radially inside said fourth cylindrical portion, and having a second guide portion for guiding the lubricating oil to said at least one second radial aperture of said fourth cylindrical portion, said second oil lubricating member being a thrust washer axially located between said first and second rotatable members.

23. A fluid operated automatic transmission according to claim 22, wherein said fourth cylindrical portion has a plurality of said at least one second radial apertures circumferentially spaced apart from each other.

24. A fluid operated automatic transmission according to claim 23, wherein said second guide portion is formed by a plurality of inclined flanges which are angled towards said radial apertures.

25. A fluid operated automatic transmission according to claim 22, wherein said third member is a ring gear which is part of a planetary gear mechanism having a sun gear, a set of first planet gears meshed with said sun gear and a set of second planet gears meshed with said ring gear with said first and second planet gears being connected via a carrier.

26. A fluid operated automatic transmission according to claim 25, wherein said carrier is operatively coupled to an input shaft by said first multiple disk clutch and said sun gear being operatively coupled to an output shaft.

* * * * *